Aug. 4, 1964
G. W. OFFENSEND ETAL
3,142,918
STRIP STORAGE DEVICE
Filed July 30, 1962
2 Sheets-Sheet 1
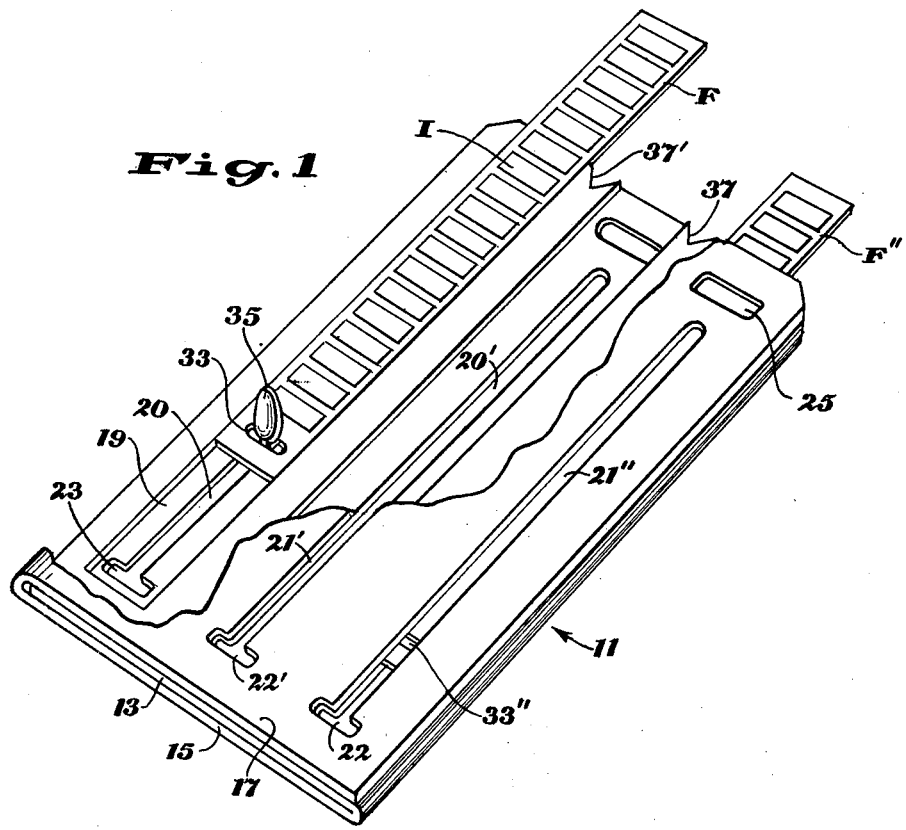
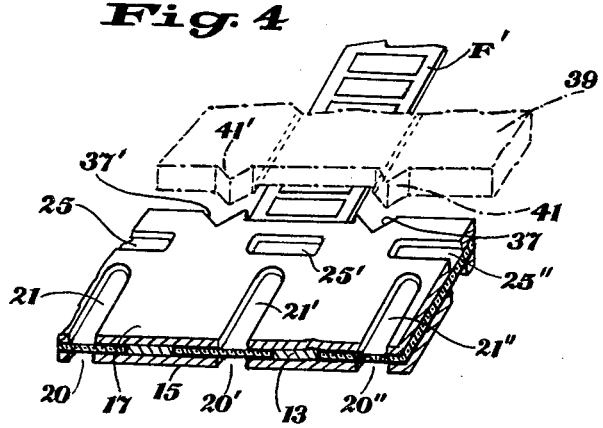
Glen W. Offensend
Norman J. Rosenburgh
INVENTORS
BY
ATTORNEYS Aug. 4, 1964   G. W. OFFENSEND ETAL   3,142,918
STRIP STORAGE DEVICE
Filed July 30, 1962   2 Sheets-Sheet 2
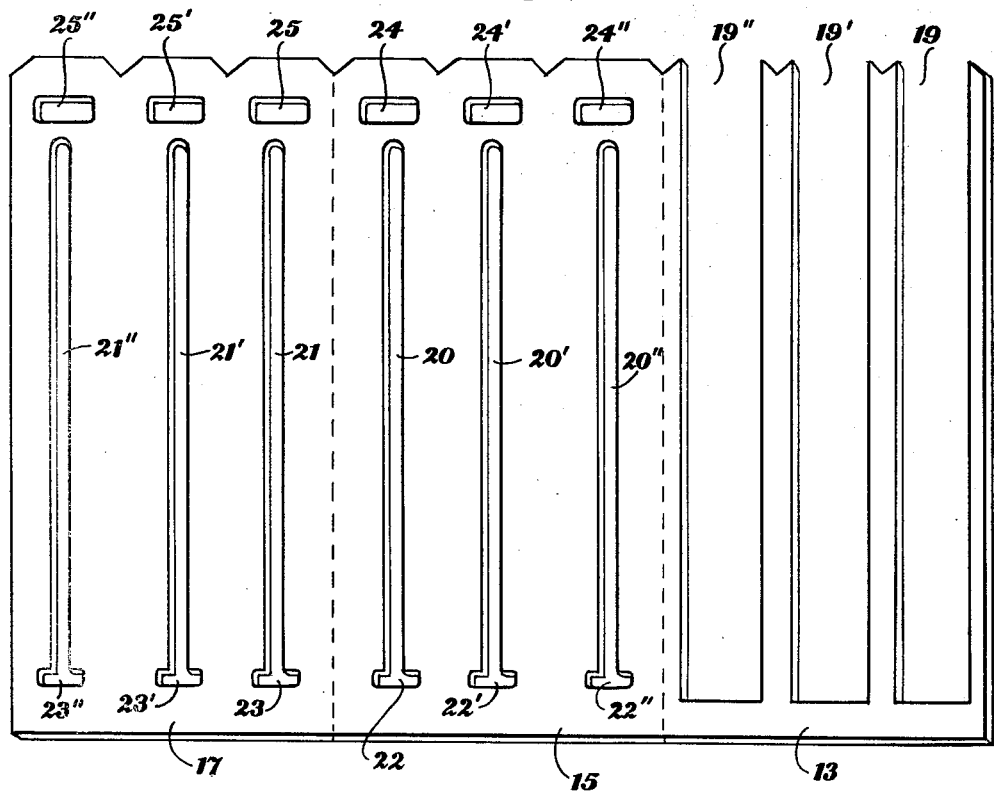
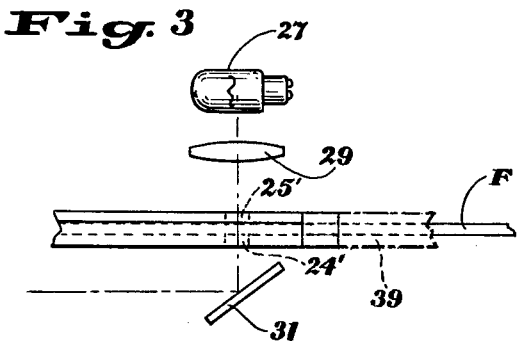
Glen W. Offensend
Norman J. Rosenburgh
INVENTORS
BY R. Frank Smith
Paul P. Holmes
ATTORNEYS

United States Patent Office 3,142,918
Patented Aug. 4, 1964

3,142,918
STRIP STORAGE DEVICE
Glen W. Offensend and Norman J. Rosenburgh, Rochester, N.Y., assignors to Eastman Kodak Company, Rochester, N.Y., a corporation of New Jersey
Filed July 30, 1962, Ser. No. 213,337
2 Claims. (Cl. 40—64)

This invention relates to a strip storage device for slideably receiving and storing one or more lengths of strip material in such a way that any selected strip can be moved longitudinally within the device to facilitate viewing or use of the same.

The strip-storage device of the present invention is especially useful in receiving and storing strips of film, e.g., microfilm. However, it will be apparent from the drawings and from the description which follows that the novel concept utilized in the strip-receiving device could be used with equal facility and with similar advantages for receiving and storing any type of material which is in strip form.

In recent years what with the increased use of photographic film as a storage media for information, there has been considerable interest in the development of new devices and methods of handling film so that the information recorded on the film may be quickly and conveniently retrieved. The strip-storage device of the present invention represents a substantial improvement over the devices previously available for handling relatively short lengths of film, and broadly, comprises a storage device having at least one strip-receiving channel and a pair of opposed slots formed in two walls of the channel and extending longitudinally thereof to permit one to engage the strip within the channel and move the same longitudinally with respect thereto. The strip storage device also has viewing apertures located adjacent to one end thereof and disposed so that information or images on the strips positioned in the channel may be situated in the aperture for viewing purposes without removing the strip from the storage device.

The primary object of the present invention is therefore to provide an improved strip-storage device.

Another object of the present invention is to provide a strip-storage device having at least one strip-receiving channel constructed to facilitate the longitudinal positioning of a strip in and relative to such channel.

Still another object of the present invention is to provide a film strip-storage device having one or more strip-receiving channels, having a viewing aperture in each channel, and constructed to facilitate longitudinal positioning of any film strip in its channel relative to the respective viewing aperture so that any selected image on the strip may be viewed without removing the film strip from the storage device.

Yet another object of the present invention is to provide a device for receiving one or more strips of image bearing film in individual strip-receiving channels, which is inexpensive to manufacture and easy to use, and which renders information recorded on such strips more quickly and conveniently retrievable.

Still other objects and advantages of the present invention will become readily apparent to those skilled in the art from the following description with reference to the drawings in which like characters denote like parts and wherein:

FIG. 1 is a picture view partly broken away of the strip-storage device of the present invention;

FIG. 2 is a picture view showing the construction of the strip-storage device;

FIG. 3 is a schematic view of a viewing apparatus illustrating how the film images on a film strip within a channel of the storage device may be viewed; and FIG. 4 is a picture view partly broken away, illustrating one means for centering any desired strip-receiving channel of the strip-storage device in a viewing apparatus.

The strip-storage device of the present invention is designated by the number 11. The device that is illustrated in the drawings has three strip-receiving channels but it will be appreciated by those skilled in the art that the storage device may have one, two, three, or more channels without departing from the novel concept disclosed. Each one of the strip-receiving channels is identical in configuration.

Referring to FIG. 2, it will be seen that the strip-storage device is made from a single sheet which is folded along the dotted lines so that the inner ply 13 is sandwiched between outer plies 15 and 17. Inner ply 13 is cut out to form one or more strip-receiving channels 19, 19', and 19", etc., the width and length of each such channel being slightly greater than the corresponding dimensions of the strip to be positioned in the channel. The two outer plies 15 and 17 are identical to each other and are formed with a plurality of longitudinal extending slots 20, 20', 20" and 21, 21', 21", respectively, which are located in opposed relation medially of the strip-receiving channels when the plies are folded together to form the storage device 11. As is apparent, the slots are T-shaped, with the horizontal portion of each T, respectively designated by the numerals 22, 22', 22" and 23, 23', 23", extending generally transversely of the respective strip-receiving channel and adjacent to the innermost end thereof. Near the opposite end of the device, that is, adjacent to the entrant portion of the channels, viewing apertures 24, 24', 24" and 25, 25', 25" are formed in opposed relation medially of the strip-receiving channels.

The size and configuration of the viewing apertures are such that the images carried on film strips F, F', F" can be positioned within the viewing apertures for viewing purposes. One way of viewing the images is schematically illustrated in FIG. 3. The viewing apertures 24' and 25', for example, are optically aligned with a projection lamp 27, condenser lens 29, and projection mirror 31. The specific embodiment of the viewing apparatus which is used in combination with the strip-storage device of the present invention can be selected from any of those known or currently available to the trade and since such structure is not a part of the present invention, it will not be further described herein.

Referring again to FIG. 1, it will be seen that the innermost ends of the strips have a perforation 33, 33" which extends a substantial distance transversely thereof. The perforation is spaced from the end of the strip so that it is in substantial alignment with the enlarged portions 22, 23, for example, of the T-shaped slots when the strips are positioned fully into the strip-receiving channels in abutment with the end of the channel formed in ply 13. Thus it is possible to insert a strip engaging pin 35 into the slot in the strip when the strip is fully inserted in the channel, i.e., in its "storage position." The pin 35 typically has a broadened handle which is formed on top of a relatively narrow neck, the width of the neck being slightly less than the width of the elongated slots 20, 21, for example, and the width of the handle being slightly smaller than the size of the perforation 33 in the strip. Thus when the pin 35 has been engaged with the strip and is thereafter moved in the elongated slots to longitudinally position the strip in the channel so that, for example, a selected image I is disposed in the viewing aperture, the broadened handle acts as a lock to prevent one from inadvertently lifting the storage device 11 from the handle without first pulling the film strip back down to its storage position in the device. Triangular notches 37, 37' are provided in the storage device between adjacent channels and in addition, the upper outside corners of the storage device are also cut off at an angle. The purpose of these notches and angle cuts, which may be formed in plies 13, 15, and 17 prior to folding to form the storage device, if desired, is to provide an index for locating the strip-receiving channels in a predetermined relation in a viewing apparatus. Such an apparatus might include an indexing member such as is schematically illustrated in FIG. 4 by the numeral 39 which has projections 41, 41' to mate with notches 37, 37' and/or angle cuts in the device. The mode of use of the indexing notches is believed to be obvious.

It will now be appreciated by those skilled in the art that we have disclosed an improved strip-storage device capable of handling and storing lengths of strip material so that the same are rendered conveniently accessible for viewing and/or for use as desired. While the invention has been described in detail with particular reference to preferred embodiments thereof, it will be understood that variations and modifications can be effected within the spirit and scope of the invention as described hereinabove and as defined in the appended claims. For example, the device 11 could be made of a single sheet folded lengthwise or from several sheets one or more (or none) of which might be folded to form the plies 13, 15, and 17.

An index comprising combinations of characters, letters, or other symbols can be applied to the top surface of the upper ply 17 preferably adjacent to the slots 21, 21', 21" in such a way that the position of each index mark corresponds to the image I on the strip F, F', or F", as the case may be, which is disposed in the viewing aperture 25, 25', 25" when pin 35 is engaged with the film and located adjacent to such mark. A further index can be placed on ply 17 to differentiate the storage device from other similar devices.

Having now particularly described our invention, what we desire to secure by Letters Patent of the United States and what we claim is:

1. A storage device for film strips bearing visible images comprising: a sheet folded upon itself to form a multiply envelope having an inner and two outer plies, (a) the inner ply having a plurality of parallel strip-receiving channels which are open on one end of the ply to receive the strips for storage therein, and
   (b) the outer plies having
      (1) a plurality of slots extending longitudinally of said channels and medially disposed in opposed relation with respect to said channels to facilitate the engagement and longitudinal movement of strips in said channels, and
      (2) a plurality of apertures located adjacent to the open ends of said channels and medially disposed in opposed relation with respect to said channels to form an opening through which film strips in said channels can be transilluminated for viewing purposes;
   (c) said device having on the one end thereof in which said channels are open a plurality of notches in a predetermined recurring pattern relative to the channels to provide an index for positioning any one of the plurality of channels in a predetermined relation to a given point.

2. A strip storage device in accordance with claim 1 and wherein the folds in said sheet are substantially parallel to the strip-receiving channels, and wherein said slots are enlarged adjacent to the end of the device opposite said one end to facilitate initial engagement of a strip.

References Cited in the file of this patent

UNITED STATES PATENTS

| | | |
|---|---|---|
| 1,678,621 | Holmes | July 24, 1928 |
| 1,934,497 | Grove | Nov. 7, 1933 |
| 2,687,590 | Johnson | Aug. 31, 1954 |
| 2,775,050 | Ellsworth | Dec. 25, 1956 |
| 2,834,136 | Kiehl et al. | May 13, 1958 |
| 2,861,370 | McArthur | Nov. 25, 1958 |
| 2,933,030 | Gornemann | Apr. 19, 1960 |
| 2,982,176 | Kay | May 2, 1962 |
| 3,063,338 | Bregman | Nov. 13, 1962 |
| 3,071,881 | Ruterbusch | Jan. 8, 1963 |

FOREIGN PATENTS

| | | |
|---|---|---|
| 128,498 | Switzerland | Nov. 1, 1928 |
| 136,065 | Great Britain | Dec. 11, 1919 |